US012759589B2

(12) United States Patent
Limaye

(10) Patent No.: US 12,759,589 B2
(45) **Date of Patent: *Oct. 13, 2026**

(54) SEMANTIC IDENTIFICATION OF PICKUP LOCATIONS

(71) Applicant: WAYMO LLC, Mountain View, CA (US)

(72) Inventor: Ashwin Limaye, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 53 days.

This patent is subject to a terminal disclaimer.

(21) Appl. No.: 18/801,993

(22) Filed: Aug. 13, 2024

(65) Prior Publication Data

US 2024/0400106 A1 Dec. 5, 2024

Related U.S. Application Data

(63) Continuation of application No. 18/145,000, filed on May 9, 2023, now Pat. No. 12,091,054, which is a (Continued)

(51) Int. Cl.
*B60W 60/00* (2020.01)
*G06Q 10/02* (2012.01)
(Continued)

(52) U.S. Cl.
CPC ....... *B60W 60/00253* (2020.02); *G06V 10/44* (2022.01); *G06V 20/56* (2022.01);
(Continued)

(58) Field of Classification Search
CPC ........ B60W 60/00253; B60W 2556/50; G06V 10/44; G06V 20/56; G08G 1/123; G06Q 10/02; G06Q 50/40
See application file for complete search history.

(56) References Cited

U.S. PATENT DOCUMENTS 9,805,605 B2 * 10/2017 Ramanujam ........... G06Q 10/00
9,836,057 B2 * 12/2017 Fairfield ............... H04W 4/029
(Continued)

FOREIGN PATENT DOCUMENTS

CN 103903428 A 7/2014
CN 110763250 A 2/2020
(Continued)

OTHER PUBLICATIONS

Intention to Grant for European Patent Application No. 21193638.0, Feb. 17, 2023.
(Continued)

*Primary Examiner* — Dale W Hilgendorf
(74) *Attorney, Agent, or Firm* — Botos Churchill IP Law

(57) ABSTRACT

A control system for an autonomous vehicle is configured to pick up a passenger at a pickup location. The autonomous vehicle includes a self-driving system and one or more computing devices in communication with the self-driving system. The one or more computing devices are configured to receive a trip request including a pickup location and a destination location, the trip request being associated with a client device; cause the self-driving system to navigate the autonomous vehicle to the pickup location; send a prompt to the client device to collect semantic information; determine a specified location based on the semantic information received in response to the prompt; identify one or more semantic markers for the specified location from the semantic information; and send a message to the client device identifying the specified location using the one or more semantic markers.

20 Claims, 11 Drawing Sheets

700

Related U.S. Application Data continuation of application No. 17/037,104, filed on Sep. 29, 2020, now Pat. No. 11,685,401.

(51) Int. Cl.

| | |
|---|---|
| ***G06Q 50/40*** | (2024.01) |
| ***G06V 10/44*** | (2022.01) |
| ***G06V 20/56*** | (2022.01) |
| ***G08G 1/123*** | (2006.01) |

(52) U.S. Cl.

CPC ......... *G08G 1/123* (2013.01); *B60W 2556/50* (2020.02); *G06Q 10/02* (2013.01); *G06Q 50/40* (2024.01)

(56) References Cited

U.S. PATENT DOCUMENTS

| | | | | |
|---|---|---|---|---|
| 10,032,181 | B1 * | 7/2018 | Madhow | G06Q 50/40 |
| 10,088,846 | B2 * | 10/2018 | Gao | G06V 40/20 |
| 10,134,286 | B1 * | 11/2018 | Elswick | G06Q 10/02 |
| 10,395,457 | B2 * | 8/2019 | Cooley | G06F 21/32 |
| 10,480,954 | B2 * | 11/2019 | Sheth | G01C 21/3476 |
| 10,656,648 | B2 * | 5/2020 | Suzuki | B60K 35/10 |
| 10,740,729 | B1 * | 8/2020 | Leary | H04W 4/029 |
| 10,809,081 | B1 * | 10/2020 | Kentley-Klay | G08G 1/202 |
| 11,493,348 | B2 * | 11/2022 | Levy | G06Q 50/40 |
| 11,685,401 | B2 * | 6/2023 | Limaye | B60W 60/00253 701/25 |
| 12,091,054 | B2 * | 9/2024 | Limaye | G06V 20/56 |
| 12,516,940 | B2 * | 1/2026 | Matthiesen | G01C 21/3407 |
| 2003/0146854 | A1 * | 8/2003 | Jones | G06Q 10/08 340/988 |
| 2003/0195699 | A1 * | 10/2003 | Jones | G06Q 10/08 340/994 |
| 2017/0059347 | A1 * | 3/2017 | Flier | G06Q 10/08355 |
| 2017/0153714 | A1 * | 6/2017 | Gao | G06V 20/56 |
| 2017/0248964 | A1 * | 8/2017 | Kentley | B60Q 1/26 |
| 2017/0249846 | A1 * | 8/2017 | Ignaczak | H04W 4/40 |
| 2017/0344010 | A1 * | 11/2017 | Rander | G06Q 10/08 |
| 2017/0370734 | A1 * | 12/2017 | Colijn | G01C 21/34 |
| 2018/0075754 | A1 * | 3/2018 | Salter | H04W 4/40 |
| 2018/0196416 | A1 * | 7/2018 | Lagnemma | G06Q 50/40 |
| 2018/0196417 | A1 * | 7/2018 | Lagnemma | G06Q 50/40 |
| 2018/0211541 | A1 * | 7/2018 | Rakah | G01C 21/3438 |
| 2018/0326997 | A1 * | 11/2018 | Sweeney | B60W 50/10 |
| 2019/0047584 | A1 * | 2/2019 | Donnelly | B60W 30/025 |
| 2019/0086222 | A1 * | 3/2019 | Arakawa | B60W 60/00253 |
| 2019/0128694 | A1 * | 5/2019 | Matsushita | B60W 60/00253 |
| 2019/0137290 | A1 * | 5/2019 | Levy | G06Q 50/40 |
| 2019/0137291 | A1 * | 5/2019 | Rong | G01C 21/3438 |
| 2019/0197325 | A1 * | 6/2019 | Reiley | G06V 20/59 |
| 2019/0204110 | A1 * | 7/2019 | Dubielzyk | G01C 21/367 |
| 2019/0206258 | A1 * | 7/2019 | Chang | G06Q 10/02 |
| 2019/0227553 | A1 * | 7/2019 | Kentley-Klay | B60H 1/00735 |
| 2019/0228246 | A1 * | 7/2019 | Yang | G06V 20/20 |
| 2019/0250002 | A1 * | 8/2019 | Zhao | B60W 50/14 |
| 2020/0013020 | A1 * | 1/2020 | Yang | G06Q 50/40 |
| 2020/0124428 | A1 * | 4/2020 | Hamilton | B60W 30/06 |
| 2020/0160709 | A1 * | 5/2020 | Ramot | G06Q 10/047 |
| 2020/0166366 | A1 * | 5/2020 | Herman | G01C 21/3438 |
| 2020/0207349 | A1 * | 7/2020 | Mimura | B60W 10/20 |
| 2020/0232809 | A1 * | 7/2020 | Rogan | G01C 21/343 |
| 2020/0234042 | A1 * | 7/2020 | Rogan | G01C 21/343 |
| 2020/0326194 | A1 * | 10/2020 | Wang | G01C 21/3484 |
| 2021/0183247 | A1 * | 6/2021 | Pandit | G06Q 50/40 |
| 2021/0278227 | A1 * | 9/2021 | Neubecker | G01C 21/3461 |
| 2021/0285782 | A1 * | 9/2021 | Lai | G01C 21/3484 |
| 2021/0306280 | A1 * | 9/2021 | Dorofiyenko | G06Q 10/02 |
| 2021/0380022 | A1 * | 12/2021 | Kanitz | B60W 60/00253 |
| 2024/0109562 | A1 * | 4/2024 | Blume | B60W 60/00253 |
| 2024/0400106 | A1 * | 12/2024 | Limaye | G08G 1/123 |

FOREIGN PATENT DOCUMENTS

| | | | |
|---|---|---|---|
| CN | 111222408 | A | 6/2020 |
| DE | 102021104896 | A1 | 9/2021 |
| WO | 2019118827 | A1 | 6/2019 |

OTHER PUBLICATIONS

The Extended European Search Report for European Patent Application No. 21193638.0, Jan. 25, 2022.

The First Office Action for Chinese Patent Application No. 202111030573.5, Mar. 14, 2025, 27 Pages.

* cited by examiner

100

200

400

700

708

900

1000

1100

SEMANTIC IDENTIFICATION OF PICKUP LOCATIONS

CROSS REFERENCE TO RELATED APPLICATIONS

The present application is a continuation of U.S. patent application Ser. No. 18/145,000, filed May 9, 2023, now U.S. Pat. No. 12,091,054, which is a continuation of U.S. patent application Ser. No. 17/037,104, filed Sep. 29, 2020, issued as U.S. Pat. No. 11,685,401, the entire disclosures of which are incorporated herein by reference.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location.

When a person (or user) wants to be physically transported between two locations via a vehicle, they may use any number of taxi services. To date, these services typically involve a human driver who is given dispatch instructions to a location to pick up the user. When the human driver nears the pickup location, they can begin to look for the user and make adjustments.

BRIEF SUMMARY

Aspects of the disclosure provide for a control system for an autonomous vehicle. The control system includes a self-driving system and one or more computing devices in communication with the self-driving system. The one or more computing devices is configured to receive a trip request including a pickup location and a destination location, the trip request being associated with a client device; cause the self-driving system to navigate the autonomous vehicle to the pickup location; send a prompt to the client device to collect semantic information related to the pickup location; determine a specified location based on the semantic information received in response to the prompt; identify one or more semantic markers for the specified location from the semantic information; and send a message to the client device identifying the specified location using the one or more semantic markers.

In one example, the one or more computing devices are configured to send the prompt when the autonomous vehicle is within a threshold distance from the pickup location. In another example, the system also includes a perception system; and the one or more computing devices are also configured to detect, using the perception system, at least one semantic marker of the one or more semantic markers while causing the self-driving system to approach the pickup location and cause the self-driving system to navigate the autonomous vehicle to the specified location relative to the detected at least one semantic marker.

In a further example, the system also includes a perception system; and the one or more computing devices are also configured to determine an updated specified location when progress to the pickup location or the specified location determined previously is slower than a threshold amount, the updated specified location being related to where the autonomous vehicle can park at least temporarily between a current location of the autonomous vehicle and the pickup location, identify, using the perception system, one or more updated semantic markers for the updated specified location, and send an updated message to the client device identifying the updated specified location using the one or more updated semantic markers. In this example, the one or more computing devices are also optionally configured to retrieve a photo from an archive history of the autonomous vehicle that shows a street view perspective of the updated specified location, and send the photo in the updated message.

In yet another example, the one or more computing devices are configured to determine the specified location based on a plurality of candidate locations that satisfy at least one of a plurality of conditions related to pickup, and the specified location is one of the plurality of candidate locations that best satisfies a most number of the plurality of conditions related to pickup. In this example, the one or more computing devices are also optionally configured to identify the plurality of candidate locations, wherein each of the candidate locations are in a vicinity of the pickup location in the trip request or in a vicinity of one of the identified one or more semantic markers. Alternatively in this example, the plurality of conditions related to pickup optionally includes accessibility to a user to be picked up and accessibility to the autonomous vehicle.

In a further example, the one or more computing devices are also configured to send vehicle semantic information to the client device to aid a passenger in recognizing the autonomous vehicle. In another example, the system also includes the autonomous vehicle.

Other aspects of the disclosure provide for a method for picking up a passenger using an autonomous vehicle. The method includes receiving, by one or more computing devices, a trip request including a pickup location and a destination location, the trip request being associated with a client device; causing, by the one or more computing devices, the autonomous vehicle to navigate to the pickup location; sending, by the one or more computing devices, a prompt to the client device to collect semantic information related to the pickup location; determining, by the one or more computing devices, a specified location based on the semantic information received in response to the prompt; identifying, by the one or more computing devices, one or more semantic markers for the specified location from the semantic information; and sending, by the one or more computing devices, a message to the client device identifying the specified location using the one or more semantic markers.

In one example, the prompt is sent to the client device when the autonomous vehicle is within a threshold distance from the pickup location. In another example, the method also includes detecting, using a perception system of the autonomous vehicle, at least one semantic marker of the one or more semantic markers while causing the autonomous vehicle to approach the pickup location; and causing, by the one or more computing devices, the autonomous vehicle to navigate to the specified location relative to the detected at least one semantic marker.

In a further example, the method also includes determining, by the one or more computing devices, an updated specified location when progress to the pickup location or the specified location determined previously is slower than a threshold amount, the updated specified location being related to where the autonomous vehicle can park at least temporarily between a current location of the autonomous vehicle and the pickup location; identifying, using a perception system of the autonomous vehicle, one or more updated semantic markers for the updated specified location; and sending, by the one or more computing devices, an updated message to the client device identifying the updated specified location using the one or more updated semantic markers. In this example, the method optionally also includes retrieving, by the one or more computing devices, a photo from an archive history of the autonomous vehicle that shows a street view perspective of the updated specified location; and sending, by the one or more computing devices, the photo in the updated message.

In yet another example, the determining of the specified location is based on a plurality of candidate locations that satisfy at least one of a plurality of conditions related to pickup; and wherein the specified location is one of the plurality of candidate locations that best satisfies a most number of the plurality of conditions related to pickup. In this example, the method optionally also includes identifying, by the one or more computing devices, the plurality of candidate locations that are in a vicinity of the pickup location in the trip request or in a vicinity of one of the identified one or more semantic markers. Alternatively in this example, the plurality of conditions related to pickup optionally includes accessibility to a user to be picked up and accessibility to the autonomous vehicle. In a further example, the method also includes sending, by the one or more computing devices, vehicle semantic information to the client device to aid a passenger in recognizing the autonomous vehicle.

Further aspects of the disclosure provide for a non-transitory, computer-readable medium configured to store instructions executable by one or more processors. The instructions, when executed, cause the one or more processors to perform a method. The method includes receiving a trip request including a pickup location and a destination location, the trip request being associated with a client device; causing an autonomous vehicle to navigate to the pickup location; sending a prompt to the client device to collect semantic information related to the pickup location; determining a specified location based on the semantic information received in response to the prompt; identifying one or more semantic markers for the specified location from the semantic information; and sending a message to the client device identifying the specified location using the one or more semantic markers.

DETAILED DESCRIPTION

Overview

Figure 1:
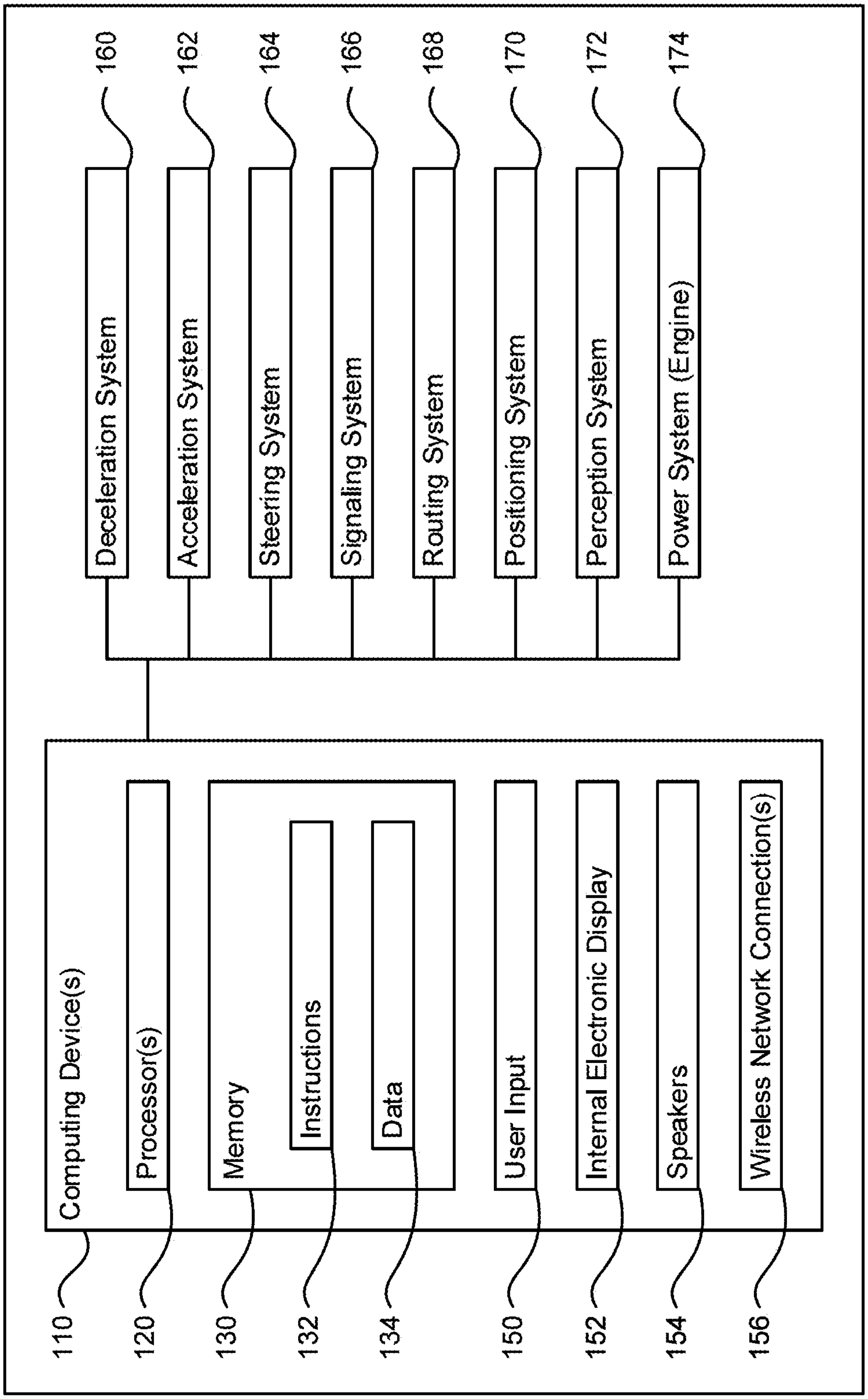
FIG. 1 is a functional diagram of an example vehicle in accordance with aspects of the disclosure.

Passenger pick-up for self-driving vehicles can be challenging due to changing environmental conditions, the absence of a human driver, and uncertainty as to how long a vehicle may have to wait (or is able to wait) for the passenger. For instance, there may be other parked cars, busy traffic, construction, or other obstacles that require the vehicle's computing devices to determine whether stopping at a given location is safe, permissible, or even a possibility. In addition, without a driver to make eye contact with the passenger and gesture for the driver to stop at a different location, the passenger can be confused about where to meet up with the vehicle. Moreover, given the changing environmental conditions mentioned above, the user may be uncertain about how long the vehicle may have to wait for the user to arrive and board the vehicle. This could change relatively quickly, for instance, based on whether a vehicle is pulling over on a busy or quiet street.

Semantic information to more precisely identify a location for picking up a passenger using an autonomous vehicle. The semantic information may be identified based on a photo, video, or text provided by the passenger waiting to be picked up using a client device, such as a mobile device. Using the photo or video, particular semantic markers may be selected to define a pick up location more specifically. For example, semantic markers may include permanent, physical landmarks and characteristics thereof. Additionally or alternatively, the semantic information may be identified based on a photo or video taken at or near a vehicle location.

A client device may send a trip request for a trip in an autonomous vehicle. The trip request may be sent to the autonomous vehicle. The trip request may include location information that identifies a pickup location and a destination location for the trip. Along with the trip request, the client device may also send semantic information related to the pickup location to better define or verify the pickup location. The vehicle's computing devices may receive the trip request and the semantic information and may determine a specified location based on the user input. The determination of the specified location may be based on one or more conditions related to safety to the passenger, accessibility to the passenger, accessibility to the vehicle, and/or case of identification using semantic information. A plurality of specified locations may be identified as satisfying at least one of the conditions, and the specified location that satisfies a highest number of the conditions may be selected.

The vehicle's computing device may send a message to the client device identifying the specified location using one or more semantic markers. The one or more semantic markers may be selected from the at least one semantic marker identified in the vicinity of the specified location. The client device may send confirmation of the specified location based on user input. Then, as the vehicle approaches the pickup location, the vehicle's computing devices may use the perception system to detect where the specified location is using the semantic information.

In some implementations, the vehicle's computing devices may additionally or alternatively identify a specified location using semantic information related to where a vehicle can park at least temporarily within a perception range of the vehicle. This specified location may be identified when the vehicle's computing devices determine that the vehicle has slower progress to the pickup location or a previously identified specified location that may delay arrival at the pickup location or the previously identified specified location more than a threshold amount. The vehicle's computing devices may then determine and select the specified location based on where the vehicle can be parked at least temporarily given a detected traffic flow, available space, and the pickup location. The vehicle's computing devices may send the specified location with semantic information to the client device to suggest the specified location as an updated pickup location.

The technology herein may allow for an autonomous vehicle and a passenger to meet at a more precise location by defining the location using semantic information. For example, a distance between the autonomous vehicle and the passenger at pickup may be smaller. In addition, a passenger may be more easily identified by the autonomous vehicle, and the autonomous vehicle may be more easily identified by the passenger. The technology may result in a more natural or smooth experience for the passenger. For instance, the experience may be more similar to hailing a car driven by a human driver.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. As an example, data 134 of memory 130 may store predefined scenarios. A given scenario may identify a set of scenario requirements including a type of object, a range of locations of the object relative to the vehicle, as well as other factors such as whether the autonomous vehicle is able to maneuver around the object, whether the object is using a turn signal, the condition of a traffic light relevant to the current location of the object, whether the object is approaching a stop sign, etc. The requirements may include discrete values, such as "right turn signal is on" or "in a right turn only lane", or ranges of values such as "having an heading that is oriented at an angle that is 30 to 60 degrees offset from a current path of vehicle 100." In some examples, the predetermined scenarios may include similar information for multiple objects.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. As an example, internal electronic display 152 may be controlled by a dedicated computing device having its own processor or central processing unit (CPU), memory, etc. which may interface with the computing device 110 via a high-bandwidth or other network connection. In some examples, this computing device may be a user interface computing device which can communicate with a user's client device. Similarly, the memory may be a hard drive or other storage media located in a housing different from that of computing device 110. Accordingly, references to a processor or computing device will be understood to include references to a collection of processors or computing devices or memories that may or may not operate in parallel.

Computing device 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100. In addition to internal speakers, the one or more speakers 154 may include external speakers that are arranged at various locations on the vehicle in order to provide audible notifications to objects external to the vehicle 100. The vehicle also may include one or more wireless network connections 156 configured to communicate wirelessly over a network to remote computing devices.

In one example, computing device 110 may be an autonomous driving computing system incorporated into vehicle 100. The autonomous driving computing system may be capable of communicating with various components of the vehicle. For example, returning to FIG. 1, computing device 110 may be in communication with various self-driving systems of vehicle 100, such as deceleration system 160 (for controlling braking of the vehicle), acceleration system 162 (for controlling acceleration of the vehicle), steering system 164 (for controlling the orientation of the wheels and direction of the vehicle), signaling system 166 (for controlling turn signals), navigation (routing) system 168 (for navigating the vehicle to a location or around objects), positioning system 170 (for determining the position of the vehicle), perception system 172 (for detecting objects in the vehicle's environment), and power system 174 (for example, a battery and/or gas or diesel powered engine) in order to control the movement, speed, etc. of vehicle 100 in accordance with the instructions 132 of memory 130 in an autonomous driving mode which does not require or need continuous or periodic input from a passenger of the vehicle. Again, although these systems are shown as external to computing device 110, in actuality, these systems may also be incorporated into computing device 110, again as an autonomous driving computing system for controlling vehicle 100.

The computing device 110 may control the direction and speed of the vehicle by controlling various components. By way of example, computing device 110 may navigate the vehicle to a destination location completely autonomously using data from the map information and navigation (routing) system 168. Computer 110 may use the positioning system 170 to determine the vehicle's location and perception system 172 to detect and respond to objects when needed to reach the location safely. In order to do so, computer 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the deceleration system 160 and acceleration system 162 may be a part of a drivetrain that includes various components between an engine of the vehicle and the wheels of the vehicle. Again, by controlling these systems, computer 110 may also control the drivetrain of the vehicle in order to maneuver the vehicle autonomously.

As an example, computing device 110 may interact with deceleration system 160 and acceleration system 162 in order to control the speed of the vehicle. Similarly, steering system 164 may be used by computing device 110 in order to control the direction of vehicle 100. For example, if vehicle 100 configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation (routing) system 168 may be used by computing device 110 in order to determine and follow a route to a location. In this regard, the navigation (routing) system 168 and/or data 134 may store map information, e.g., highly detailed maps that computing devices 110 can use to navigate or control the vehicle. As an example, these maps may identify the shape and elevation of roadways, lane markers, intersections, crosswalks, speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and right lane lines or other lane markers that define the boundary of the lane. Thus, most lanes may be bounded by a left edge of one lane line and a right edge of another lane line.

Figure 2:
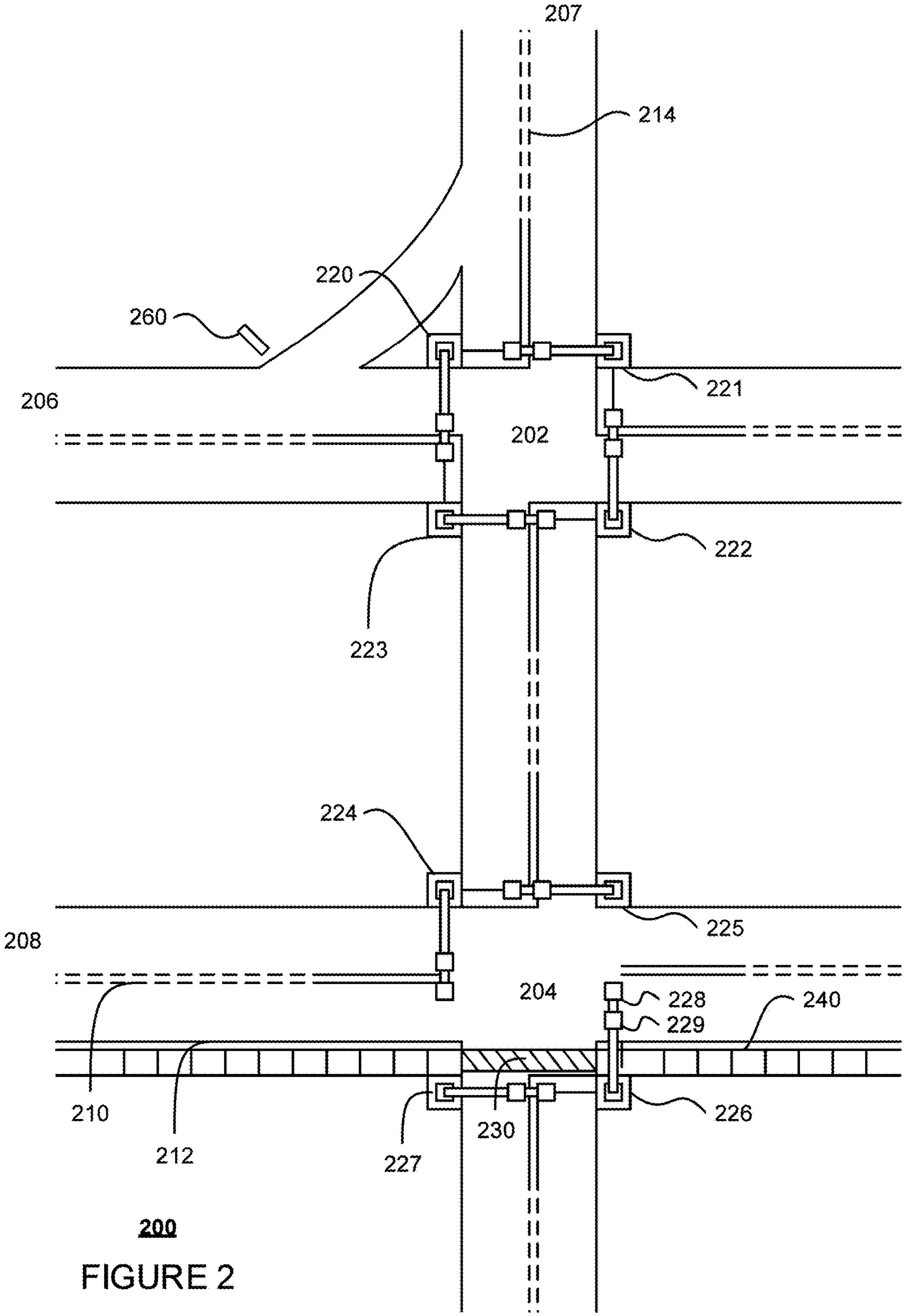
FIG. 2 is an example representation of detailed map information in accordance with aspects of the disclosure.

FIG. 2 is an example of map information 200 for a section of roadway including intersections 202 and 204. Intersection 202 is a traffic light intersection where roads 206 and 207 intersect, and intersection 204 is a traffic light intersection where roads 207 and 208 intersect. Roads 206 and 208 may run parallel to each other in the section of roadway shown in FIG. 2, and road 207 may run perpendicular to roads 206 and 208. In this example, the map information 200 includes information identifying the shape, location, and other characteristics of lane lines 210, 212, 214, traffic signal lighting poles 220, 221, 222, 223, 224, 225, 226, 227, traffic signal lights, crosswalk 230, sidewalk 240, and yield sign 260. Each traffic signal lighting pole may have two traffic signal lights. For example, traffic signal lights 228 and 229 are on traffic signal lighting pole 226. Although not shown, the detailed map information may also include historical information identifying typical and historical traffic conditions at various dates and times.

Although the detailed map information is depicted herein as an image-based map, the map information need not be entirely image based (for example, raster). For example, the detailed map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Figure 3:
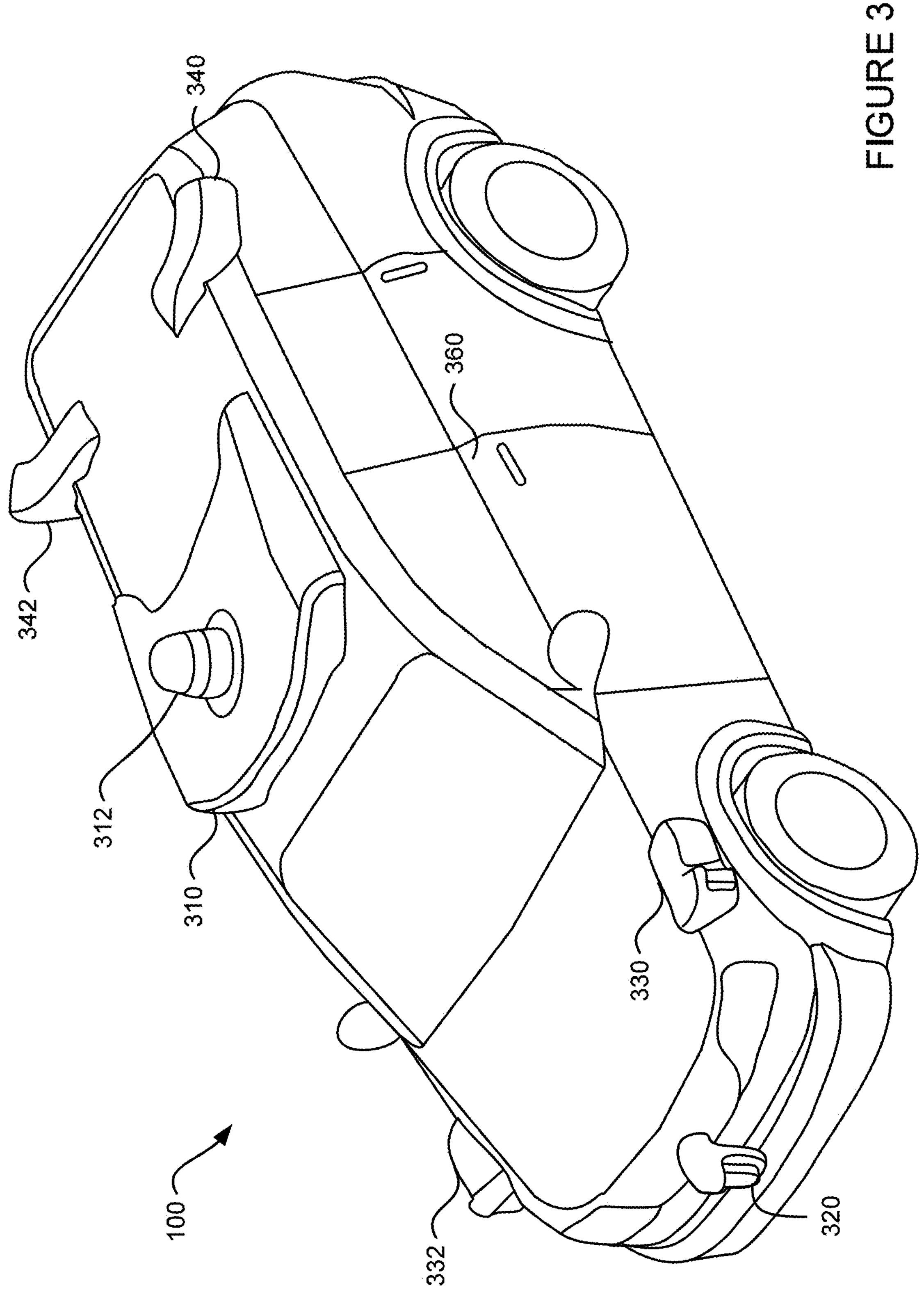
FIG. 3 is an example external views of a vehicle in accordance with aspects of the disclosure.

FIG. 3 is an example external view of vehicle 100 including aspects of the perception system 172. For instance, roof-top housing 310 and dome housing 312 may include a LIDAR sensor or system as well as various cameras and radar units. In addition, housing 320 located at the front end of vehicle 100 and housings 330, 332 on the driver's and passenger's sides of the vehicle may each store a LIDAR sensor or system. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310.

Figure 4:
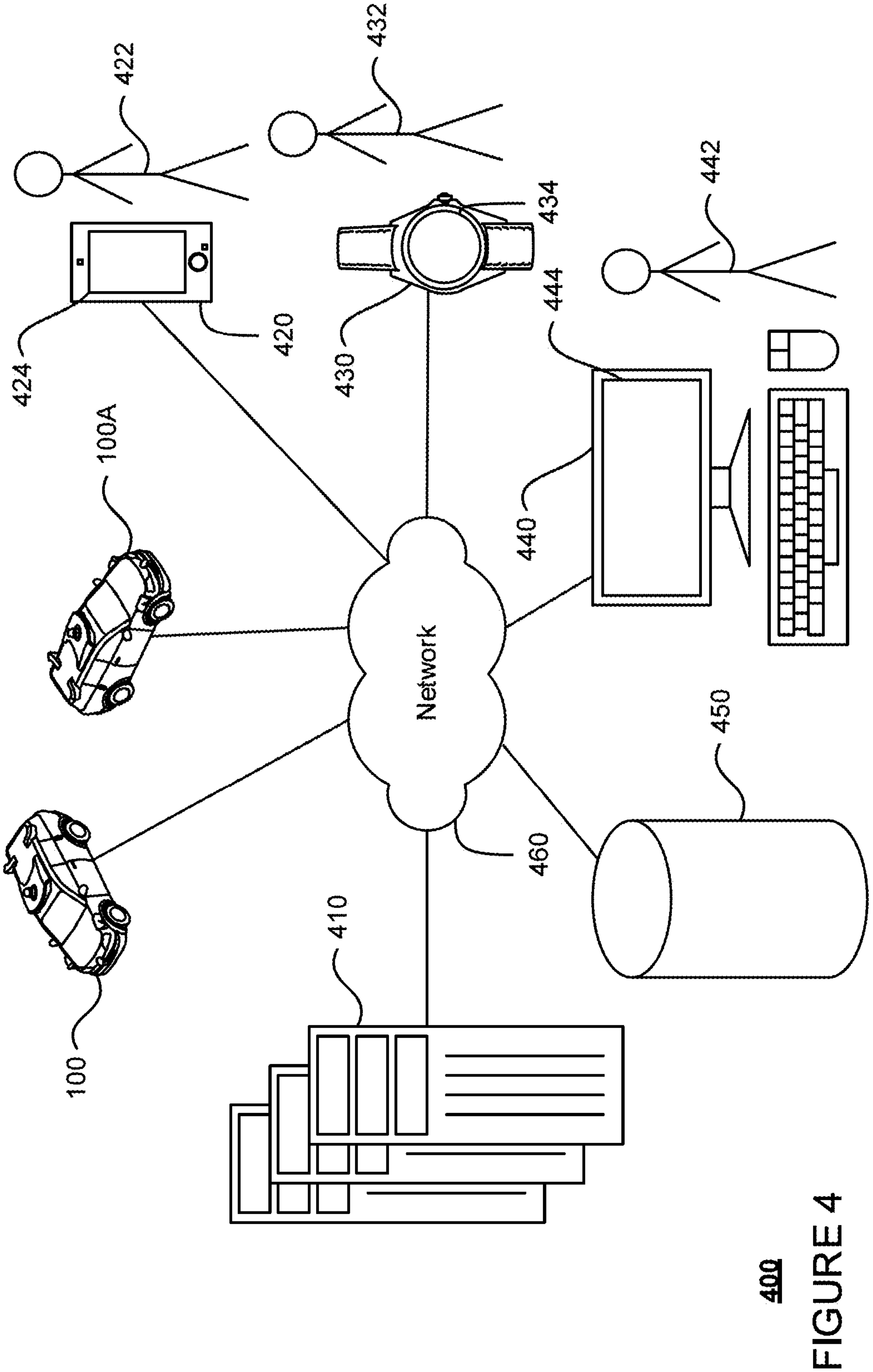
FIG. 4 is an example pictorial diagram of a system in accordance with aspects of the disclosure.
Figure 5:
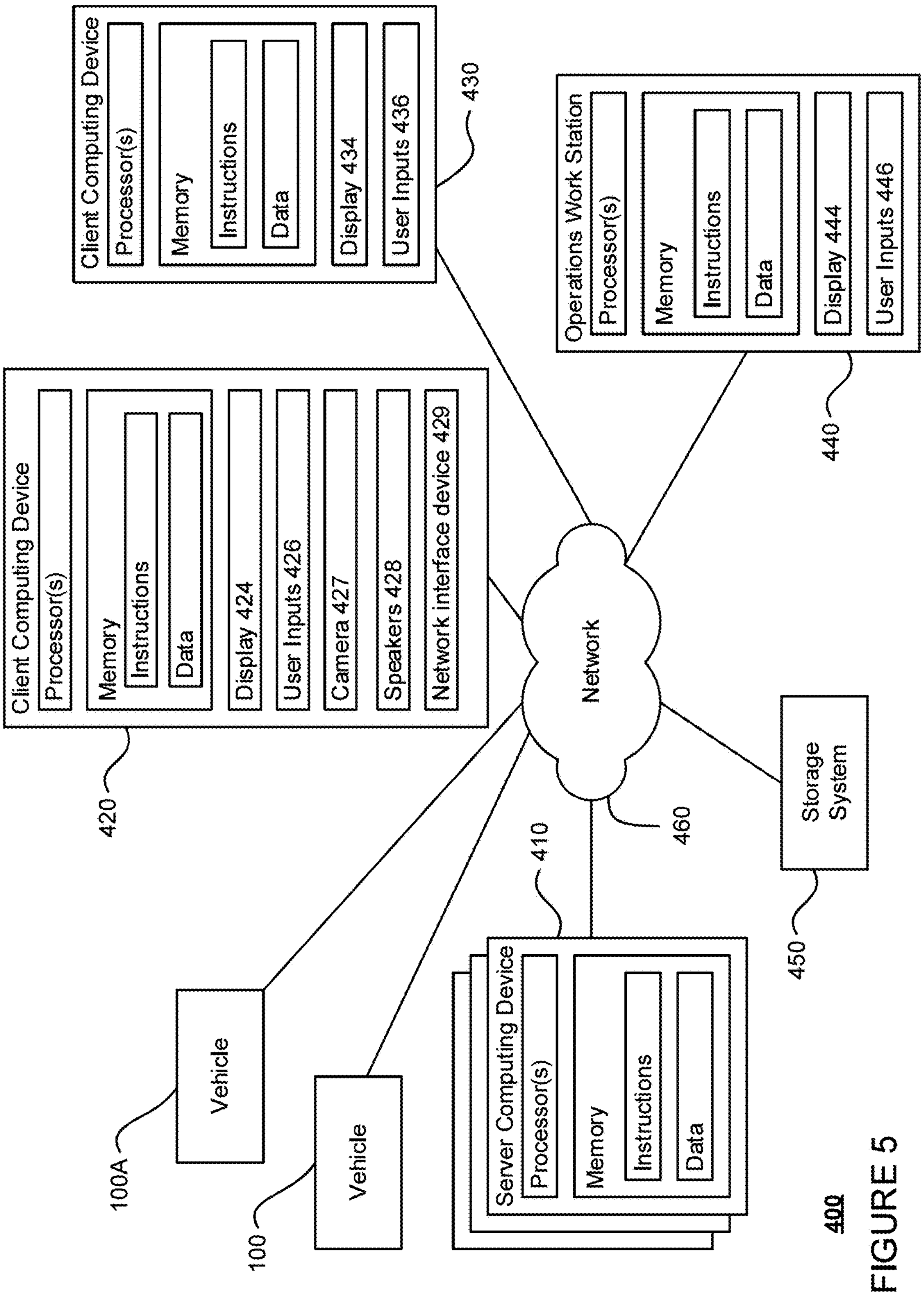
FIG. 5 is a functional diagram of the system of FIG. 4 in accordance with aspects of the disclosure.

The one or more computing devices 110 of vehicle 100 may also receive or transfer information to and from other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100, and vehicle 100A which may be configured similarly to vehicle 100. Although only a few vehicles and computing devices are depicted for simplicity, a typical system may include significantly more.

As shown in FIG. 4, each of computing devices 410, 420, 430, 440 may include one or more processors, memory, data and instructions. Such processors, memories, data and instructions may be configured similarly to one or more processors 120, memory 130, instructions 132, and data 134 of computing device 110.

The network 460, and intervening nodes, may include various configurations and protocols including short range communication protocols such as BLUETOOTH™, BLUETOOTH™ LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include a server having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with one or more computing devices 110 of vehicle 100 or a similar computing device of vehicle 100A as well as client computing devices 420, 430, 440 via the network 460. For example, vehicles 100 and 100A may be a part of a fleet of vehicles that can be dispatched by server computing devices to various locations. In this regard, the vehicles of the fleet may periodically send the server computing devices location information provided by the vehicle's respective positioning systems and the one or more server computing devices may track the locations of the vehicles.

In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 5, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touch-screen or microphone). Some of the client computing devices, such as client computing device 420, may also include a camera 427 for capturing images or recording video streams, speakers 428, a network interface device 429, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a head-mounted computing system in FIG. 5. As an example the user may input information using a small keyboard, a keypad, microphone, using visual signals with a camera, or a touch screen.

In some examples, client computing device 440 may be concierge work station used by an administrator to provide concierge services to users such as users 422 and 432. For example, a concierge 442 may use the concierge work station 440 to communicate via a telephone call or audio connection with users through their respective client computing devices or vehicles 100 or 100A in order to ensure the safe operation of vehicles 100 and 100A and the safety of the users as described in further detail below. Although only a single concierge work station 440 is shown in FIGS. 4 and 5, any number of such work stations may be included in a typical system.

Storage system 450 may store various types of information as described in more detail below. This information may be retrieved or otherwise accessed by a server computing device, such as one or more server computing devices 410, in order to perform some or all of the features described herein. For example, the information may include user account information such as credentials (e.g., a user name and password as in the case of a traditional single-factor authentication as well as other types of credentials typically used in multi-factor authentications such as random identifiers, biometrics, etc.) that can be used to identify a user to the one or more server computing devices. The user account information may also include personal information such as the user's name, contact information, identifying information of the user's client computing device (or devices if multiple devices are used with the same user account), as well as one or more unique signals for the user.

The storage system 450 may also store routing data for generating and evaluating routes between locations. For example, the routing information may be used to estimate how long it would take a vehicle at a first location to reach a second location. In this regard, the routing information may include map information, not necessarily as particular as the detailed map information described above, but including roads, as well as information about those road such as direction (one way, two way, etc.), orientation (North, South, etc.), speed limits, as well as traffic information identifying expected traffic conditions, etc.

The storage system 450 may also store information which can be provided to client computing devices for display to a user. For instance, the storage system 450 may store predetermined distance information for determining an area at which a vehicle is likely to stop for a given pickup or destination location. The storage system 450 may also store graphics, icons, and other items which may be displayed to a user as discussed below.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIG. 4 and/or may be directly connected to or incorporated into any of the computing devices 110, 410, 420, 430, 440, etc.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

In one aspect, a user may download an application for requesting a vehicle to a client computing device. For example, users 422 and 432 may download the application via a link in an email, directly from a website, or an application store to client computing devices 120 and 130. In another example, client computing device 420 or 430 may transmit a request for the application over the network, such as to one or more server computing devices 410, and in response, receive the application. The application may be installed locally at the client computing device 420 or 430.

The user may then use a client computing device to access the application and send a trip request to be a passenger in an autonomous vehicle. As an example, a user such as user 422 may use client computing device 420 to send a request to one or more server computing devices 410 for a vehicle. As part of this, the user may identify a pickup location, a destination location, and, in some cases, one or more intermediate stopping locations anywhere within a service area where a vehicle can stop.

These pickup and destination locations may be predefined (e.g., specific areas of a parking lot, etc.) or may simply be any location within a service area of the vehicles. As an example, a pickup location can be a current location of the user's client computing device 420, or can be input by the user at the user's client computing device 420. For instance, the user may enter an address or other location information or select a location on a map to select a pickup location. Selecting the location may include a user using a finger to tap on a map displayed on the display 424 of client computing device 420. In response, the location of the tap on the map, displayed as a map marker, may be identified as a requested location. In other examples, the user may select a location from a series of saved locations, a list of recent locations, or a set of locations corresponding to a search query such as from a map or location-based search engine.

Figures 6A, 6B, 6C:
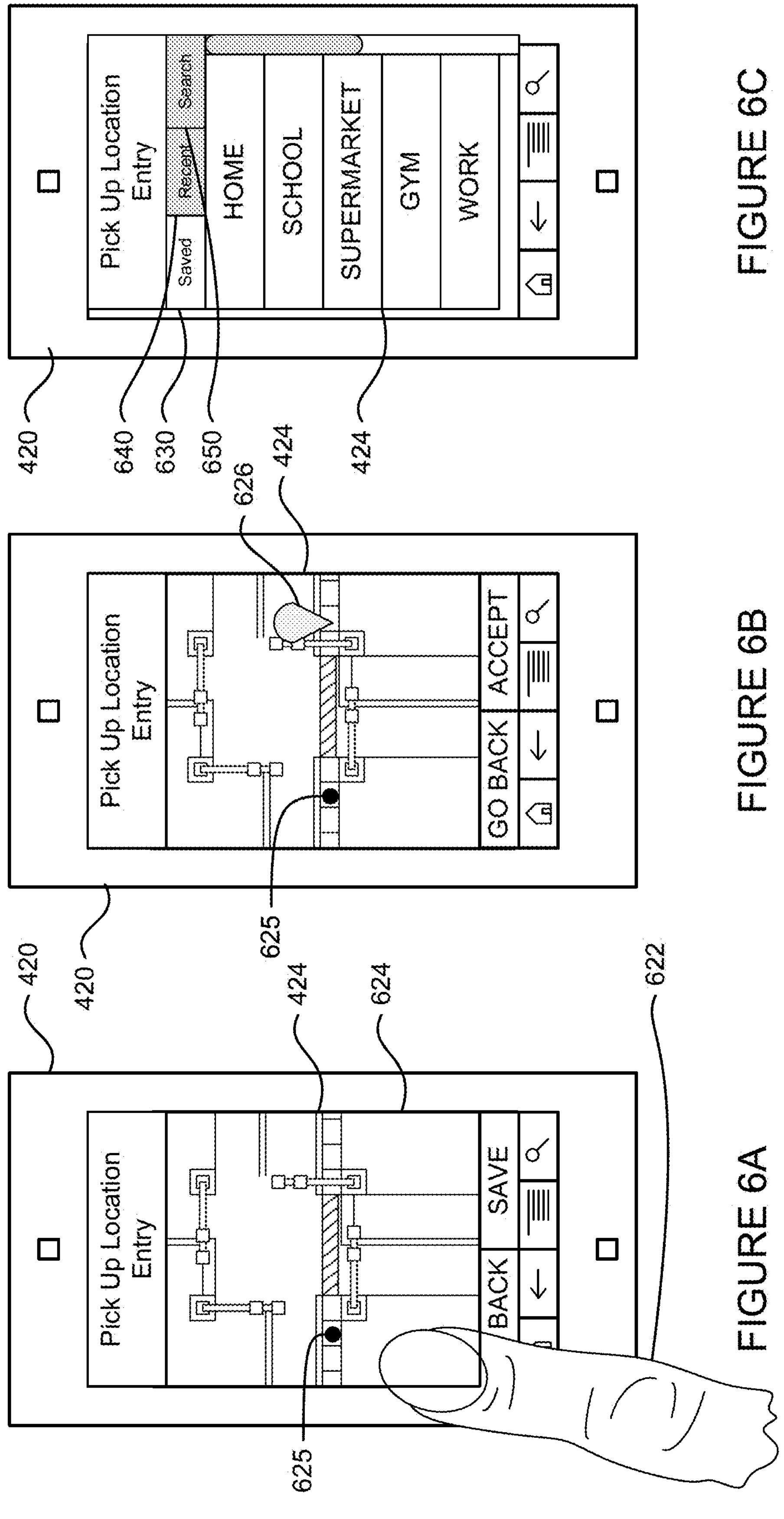
FIGS. 6A-6C are various example screenshots and client computing devices in accordance with aspects of the disclosure.

For example, as shown in FIG. 6A, user 422 may use a finger 622 to tap on a map 624 displayed on the display 424 of client computing device 420. The map 624 may be a portion of the section of roadway shown in map information 200; in particular including the portion surrounding intersection 204. A current location 625 of the client computing device 420 may be displayed as a dot on the map 624. In response, as shown in FIG. 6B, the location of the tap on the map, displayed as map marker 626, may be identified as a requested location. Allowing the user to input or select a location may be especially helpful where the user is not currently located at the pickup location but will be by the time the vehicle arrives. In the example of FIG. 6C, a user is provided with a plurality of options for inputting locations. As shown, the user is able to select from a series of saved locations under a saved option 630 previously saved by the user as discussed above. The user may also be provided with option 640 which provide the user with the ability to view a list of recent locations. By selecting option 650, the user may be able to conduct a location search. For example, a user may enter a search query ("fast food restaurant" or "doctor doe" or "gas station near me") and receive a set of locations corresponding to the search query as with a typical map or location-based search engine.

Once a pickup location and destination location have been identified, the client computing device 420 may send the location or locations to one or more server computing devices of the centralized dispatching server computing device or directly to an autonomous vehicle, such as vehicle 100. As shown in sample communications 700 shown in FIG. 7, a trip request 702 for a vehicle being made by a user at a client computing device 420 is sent to one or more server computing devices 410. In this example, client computing device 420 may run an application as described above. Display 424 of client computing device 420 receives from a user, such as user 422, user input for the request, such as text indicating a pickup location and a destination location. In response, the client computing device 420 sends the request 702 to the one or more server computing devices 410, for example, via network 460. In this example, the trip request 702 includes the identified pickup location and destination location. The trip request 702 may also include a current location of the client computing device 420, authentication information for the client computing device 420, or semantic information as described further below. When received by the one or more server computing devices, such as server computing device 410, the one or more server computing devices may select a vehicle to dispatch to pick up the user, for instance based on availability, proximity to the pickup location, size, fuel level, or other conditions related to being capable of executing the trip request. For example, vehicle 100 may be selected because it is the closest vehicle to the pickup location that is not currently assigned a task. The one or more server computing devices may then dispatch the selected vehicle by providing the vehicle with the pickup and destination locations identified in the trip request 702.

When a vehicle, such as vehicle 100, receives the trip request, the vehicle's computing devices 110 may operate the vehicle 100 to the pickup location to perform the user's request. For example, the vehicle's computing devices 110 may determine a route between the vehicle's current location and the pickup location using stored map information. Alternatively, the server computing device 410 may determine a route along the map between the vehicle's current location and the pickup location using map information in the storage system 450 and send the route to the vehicle's computing device 110 to navigate the vehicle to the pickup location.

Figure 7:
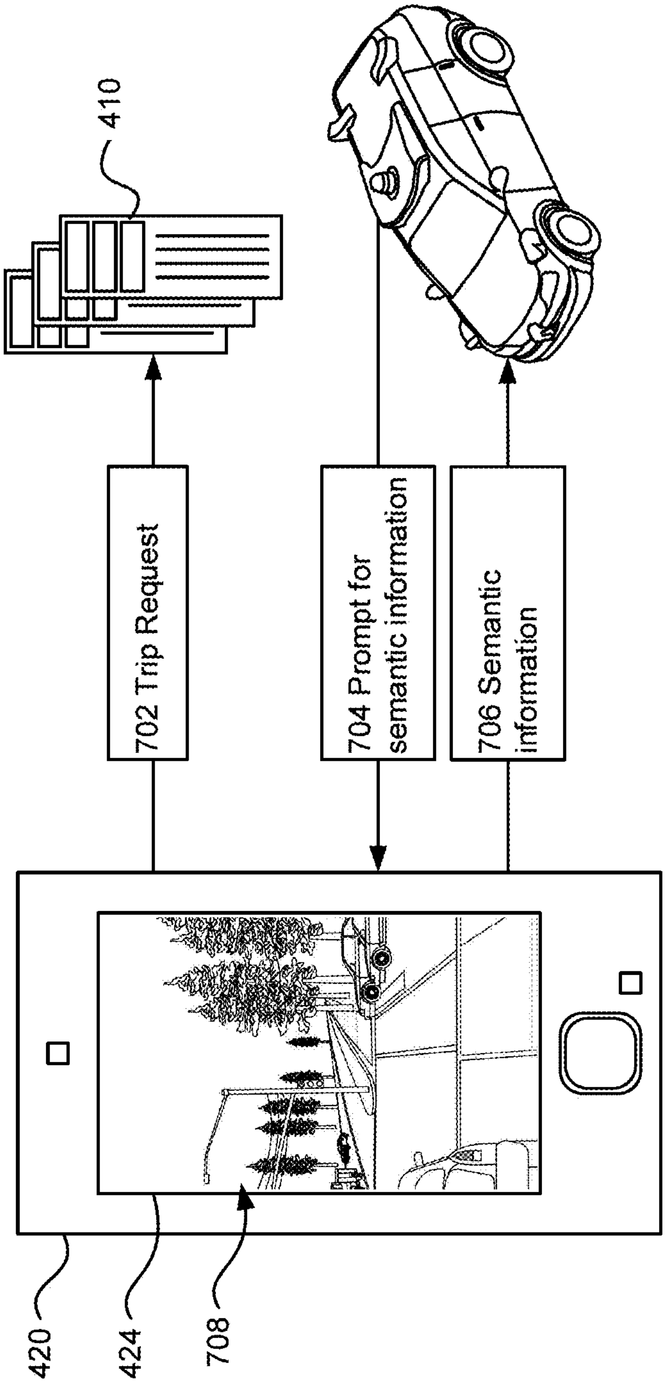
FIG. 7 is an example pictorial diagram of messages sent through the system of FIG. 4 in accordance with aspects of the disclosure.

At some point after the vehicle receives the trip request, the vehicle's computing devices 110 may send a request, or prompt, to the client computing device 420 for semantic information about the pickup location. As shown in FIG. 7, the vehicle's computing device 110 may send a prompt 704 for semantic information to the client computing device 420 after the trip request 702 is received by the vehicle's computing devices 110. Alternatively, the server computing device 410 may send this prompt to the client computing device 420. The timing for sending the prompt may be when the vehicle is within a particular distance or a particular amount of time away from the pickup location included in the trip request. In other examples, the timing may be closer to when the trip request is received, such as immediately after the vehicle's computing devices receives the trip request. Additionally or alternatively, a prompt for semantic information may be provided in the application before the trip request is sent from the client computing device 420 to include the semantic information as part of the trip request.

Figure 8:
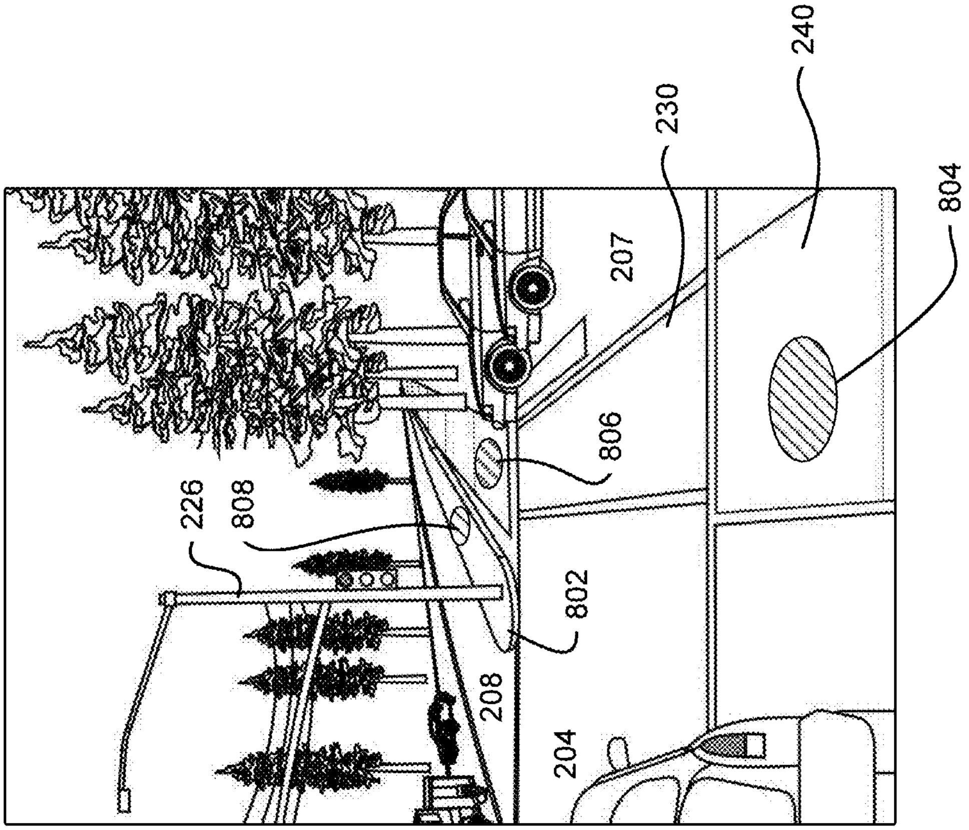
FIG. 8 is an example photo in accordance with aspects of the disclosure.

After the prompt is received at the client computing device 420, the client computing device 420 may receive input related to the prompt. For example, as shown in FIG. 7, input of semantic information 706 may be received at the client computing device 420 and be transmitted to the vehicle's computing devices 110. In one example, the input may be received using a camera on the client computing device, such as camera 427 of the client computing device 420, to capture a photo or video or by accessing a photo or video stored in a memory of the client computing device. As shown in FIG. 7, the input of semantic information may include photo 708. As shown in FIG. 8, photo 708 captures an area at intersection 204 that shows traffic signal lighting pole 226 along portions of sidewalk 240, trees to the side of the road, and a few vehicles on the road. In addition, the view in the photo 708 may show that a raised curb area 802 exists along a portion of the sidewalk 240. The traffic signal lighting pole 226 may be shown in the raised curb area 802. In another example, the input may be received as text input in a text box in an interface of the client computing device, such as display 424 of client computing device 420. The text input may include terms such as "traffic signal pole," "sidewalk," and/or "trees." In a further example, the input may be received using a microphone on the client computing device to capture the user's voice. The voice input may be, for example, the user saying "pick me up next to the traffic light pole."

The vehicle's computing devices 110 may process the user input received in response to the prompt to check if the user input is acceptable. The acceptability may be based on whether semantic markers may be identified using the user input at or near the pickup location. For example, the vehicle's computing devices 110 may process a photo or video to see if at least one semantic marker is detected in the photo or video. The at least one semantic marker may be a stationary, physical landmark. For example, in the photo 708, the vehicle's computing devices 110 may identify semantics marks such as traffic signal light pole 226, the raised curb area 802, sections of sidewalk 240, or one or more trees. Optionally, the at least one semantic marker may be a stationary, physical landmark that is determined to be a permanent or semi-permanent fixture that is not likely to move prior to the vehicle picking up the user, such as a parked vehicle. In another example, the vehicle's computing devices 110 may parse the text or voice input for information that includes reference to physical landmark and/or characteristics thereof that may be used as a semantic marker. If the user input is not acceptable, another prompt may be sent to the client device for additional user input. Otherwise the vehicle's computing devices may continue with the process.

The vehicle's computing devices 110 may determine a specified location based on the user input. For example, the vehicle's computing devices may identify one or more candidate locations that are in a vicinity of the pickup location in the trip request and in a vicinity of one of the at least one semantic marker identified using the user input. The vicinity may be defined as being in a line-of-sight of a given location or marker, which may be determined using stored LIDAR data or 3D modeling, or may be defined as a distance from the given location or marker, such as 25 feet or more or less. When the user input is a photo or video, the vehicle's computing devices may use image processing to identify the one or more candidate locations in the photo or video that are at or near the pickup location. When the user input is text or voice input, the vehicle's computing devices may access a stored image at or near the pickup location to be processed for the one or more candidate locations that are at or near the at least one semantic marker identified in the text or voice input. In some cases, vicinity to the at least one semantic marker identified in the user input may be weighted more heavily than vicinity to the pickup location in the trip request.

As shown in FIG. 8, the following candidate locations may be identified: a first candidate location 804 on sidewalk 240 along road 208, the first candidate location 804 being closer to the client computing device's current location than the received pickup location; a second candidate location 806 on sidewalk 240 along road 208 next to traffic signal light pole 226, the second candidate location 806 being on the other side of the intersection 204 than the client's computing device's current location and being closer to the received pickup location than the current location; and a third candidate location 808 on the raised curb area 802 closer to the road 208 than sidewalk 240, the third candidate location being closer to the received pickup location than the current location.

The specified location may be selected from the identified one or more candidate locations. The selection of the specified location may factor in one or more pickup conditions, such as safety to the user to be picked up, accessibility to the user, accessibility to the vehicle, and/or case of identification using semantic information. For example, the one or more pickup conditions may include being safe from traffic and other possible hazards, accessible to the user, being accessible to the vehicle within a threshold distance, and having at least one semantic marker in its vicinity that is both visible to the user and detectable by the vehicle. The one or more pickup conditions may also include having a fewer number of people is predicted to be located based on foot traffic or other pedestrian behavior in order to prevent confusion regarding who is the user to be picked up. In another example, the one or more conditions also include allowing for an earlier pickup time or a faster pickup experience. A plurality of candidate locations may be identified as satisfying at least one of the conditions, in which case the candidate location that satisfies a highest number of the conditions or best satisfies the plurality of conditions may be selected as the specified location. For a condition such as accessibility to a candidate location, a candidate location that is closer to where a vehicle can park or where a passenger may safely wait can be determined to better satisfy the condition.

For example, the first candidate location 804, the second candidate location 806, and the third candidate location 808 may all satisfy at least one of the conditions. The third candidate location 808 may be selected as the specified location because it is closest to the received pickup location, in the vicinity of the most identifiable semantic marker (the traffic signal light pole 226), more accessible by the vehicle because it is closer to the road 208, and a safe distance from intersection 204.

Figure 9:
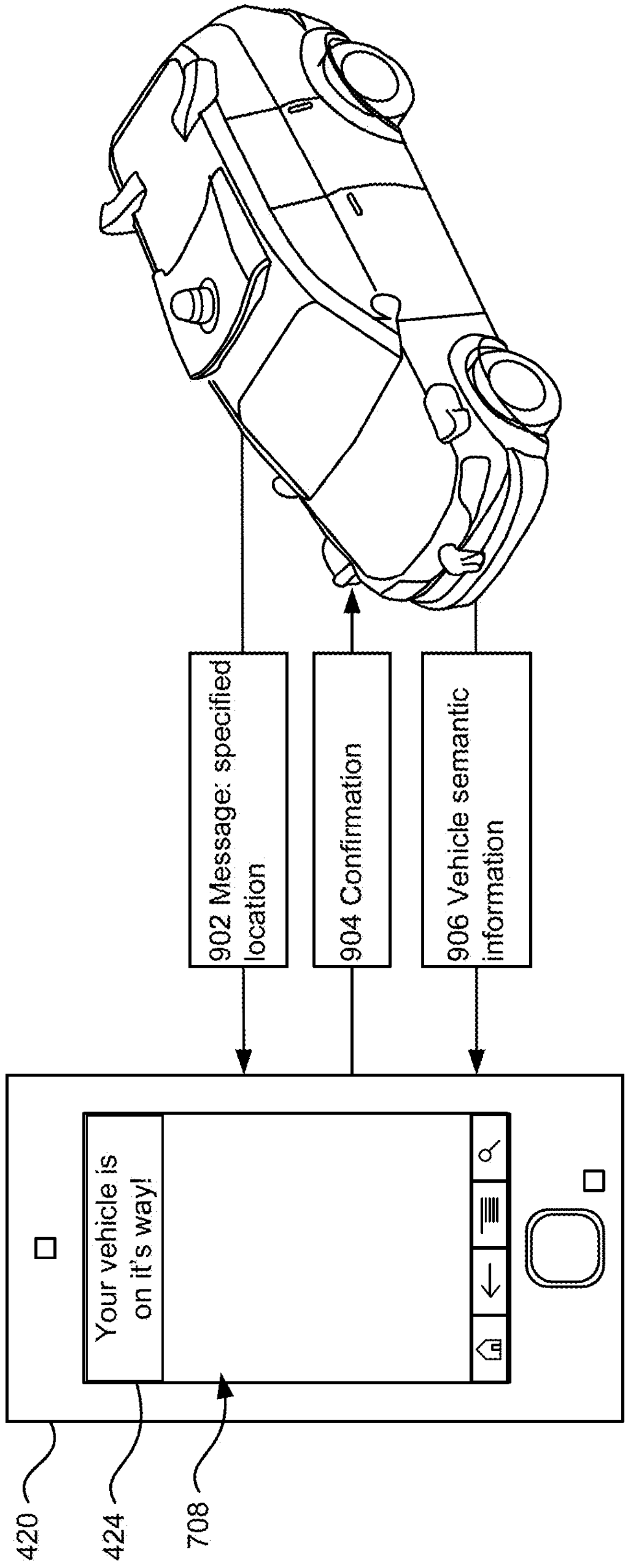
FIG. 9 is another example pictorial diagram of messages sent through the system of FIG. 4 in accordance with aspects of the disclosure.

As shown in sample communications 900 shown in FIG. 9, the vehicle's computing device 110 may send a message 902 to the client computing device 420 identifying the specified location using one or more semantic markers. The one or more semantic markers may be selected from the at least one semantic marker identified in the vicinity of the specified location. The one or more semantic markers included in the message may be selected when it is closest to the specified location, requires a least amount of descriptors to identify, is simplest for the user to understand spatially, or is most easily identified by the user and/or detectable by the vehicle. The message may be sent using text, photo, or other form or combination thereof.

The client computing device 420 may send confirmation 904 of the specified location based on user input from the user. Alternatively, the client computing device 420 may send a request for a different specified location based on user input. The request for a different specified location may include an updated pickup location and/or updated semantic information. In response to the request for a different specified location, the process of determining a specified location may be performed as described above using the updated information.

As the vehicle 100 approaches the pickup location, the vehicle's computing devices 110 may use the perception system 172 to detect where the specified location is using the semantic information. The vehicle's computing devices 110 may then navigate to the specified location by controlling the various self-driving systems of the vehicle 100 to pick up the user for the trip request. Picking up the user includes stopping at a safe location by the specified location and verifying credentials of the user for the trip request. In addition, the vehicle's computing devices 110 may also send vehicle semantic information 906, such as color of the vehicle, make and model of the vehicle, size of the vehicle, light pattern emitted by the vehicle, etc., to the client device as the vehicle approaches the specified location to aid the user in recognizing the vehicle 100.

Additionally or alternatively, the vehicle's computing devices 110 may identify a specified location using semantic information related to where the vehicle 100 can park at least temporarily within a perception range of the vehicle 100. The specified location for parking at least temporarily may be an area along a curb where no other vehicle is parked or along a street where double parking is permitted temporarily and may be accessible by the user. This specified location may be identified when the vehicle's computing devices 110 determine that the vehicle 100 has slower progress to one of the pickup location or a previously identified specified location than originally planned. For example, the vehicle's computing devices 110 may determine that the vehicle 100 may arrive later than originally predicted at such location by more than a threshold amount. The threshold amount may be 5 minutes or more or less. Data related to predicted slow down along road 208 may be determined or accessed by the vehicle's computing devices 110. In the example shown in FIGS. 6-8, the vehicle's computing devices 110 may determine that an accident occurring at or near intersection 204 may prevent or slow progress of the vehicle 100 along road 208 towards the specified location 808.

The vehicle's computing devices 110 may then determine the specified location based on where the vehicle 100 can be park at least temporarily given a detected traffic flow, available space, and the pickup location. To determine this specified location, the vehicle's computing devices 110 may detect objects in a vicinity of a current location of the vehicle 100 and characteristics of the objects. From the detected objects and their characteristics, the traffic flow and available space along a side of a road may be detected. Based on the traffic flow, the vehicle's computing devices 110 may determine where the vehicle 100 may slow or stop along the route. The specified location may be determined to be an area in the available space along the side of the road that is (i) determined to be a size where the vehicle can park, (ii) positioned where the vehicle 100 can pull over to park before the vehicle 100 slows or stops along the route, and (iii) accessible by the user based on a current location of the user's client computing device 420. In the example with the accident at or near intersection 204, the vehicle's computing devices 110 may determine the specified location to be located on the sidewalk 240 along road 208 on the near side of the intersection 204 relative to the vehicle 100 before the traffic flow stops or nearly stops, since temporarily stopping at the side of the road to pick up a passenger is acceptable in the area and the user is able to walk along the sidewalk to reach the vehicle at such location.

The vehicle's computing devices 110 may select semantic information to define the specified location. The semantic information may be selected based on what is most visible from a user perspective and/or what is easily identified from the user perspective. The user perspective may be based on a current location of the user's client computing device 420 and/or a trajectory of the user's client computing device 420 towards the specified location. In addition, the semantic information may be selected based on what is in the vicinity of the specified location. For example, the semantic information may be related to a street sign, a storefront sign, nearby parked vehicles, or a vehicle immediately preceding the vehicle 100. In the scenario for temporarily stopping on the near side of intersection 204, the vehicle's computing devices 110 may select semantic information including a number of sidewalk sections away from the client computing device's current location or the intersection 204, as well as color, make, and/or model of a vehicle immediately in front of the vehicle 100.

The vehicle's computing devices 110 may send the specified location with the semantic information to the client device. In some examples, the semantic information may be sent in text format. In other examples, the semantic information may be a photo of where the specified location is. The photo may be retrieved from an archive history from the vehicle's memory that shows the specified location from the user perspective. For example, the photo may show a street view of the specified location. The archive history may include the photos or videos collected while the vehicle 100 is traveling to the pickup location. In addition, the archive history may include photos and videos at or near the vehicle's current location that was collected in previous trips in the area. In other examples the photo may be retrieved from the storage system 450 remote from the vehicle 100.

In some alternative implementations, the client computing device 110 may perform one or more steps above performed by the vehicle's computing devices 110.

In other alternative implementations, the semantic information sent from the client computing device 420 to the vehicle 100 may include characteristics of the user for the trip. For example, the user may input information related to physical characteristics of the user, clothing worn by the user, accessories held by the user, etc. The vehicle's computing devices 110 may use the characteristics of the user to determine who the passenger to be picked up as the vehicle 100 approaches the specified location. The vehicle's computing devices 110 may adjust operation of the vehicle 100 to meet the determined passenger for pickup.

In some examples, the specified location may also be based also on an updated user location. The location of the user's client computing device 420 determined using GPS and/or other location services at the user's client computing device 420 may be sent directly (or indirectly by way of a dispatching server computing device) to the vehicle. The identified one or more candidate locations may also be at or near the updated user location.

Figure 10:
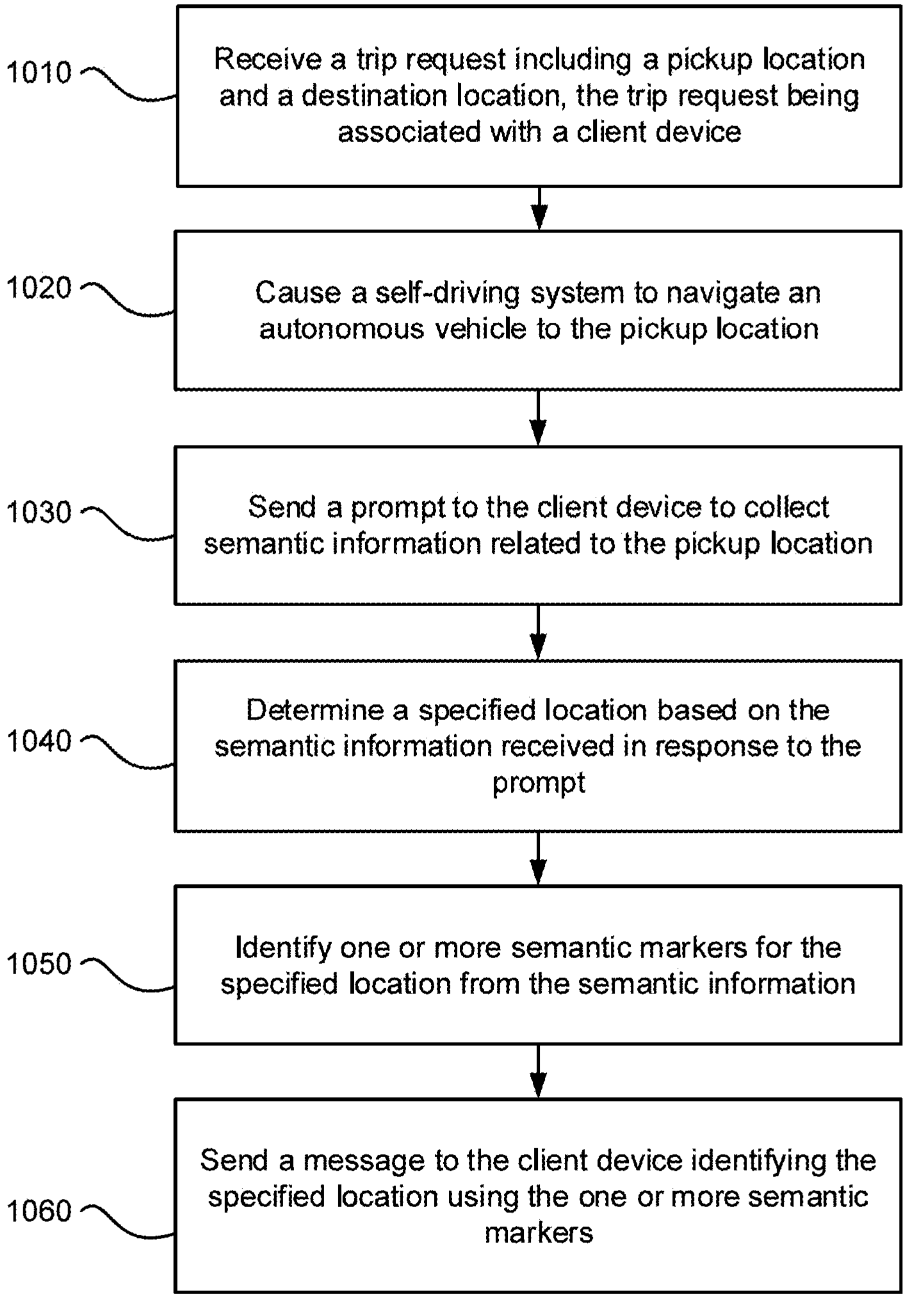
FIG. 10 is an example flow diagram in accordance with aspects of the disclosure.

FIG. 10 shows an example flow diagram 1000 in accordance with aspects of the disclosure. More specifically, FIG. 10 shows a flow of an example method for identifying pickup locations performed by the vehicle's computing devices 110. Alternatively, one or more of the steps in the example method may be performed by one or more computing devices remote from the vehicle 100, such as server computing devices 410.

At block 1010, a trip request, such as trip request 702, may be received that includes a pickup location and a destination location. The trip request is associated with a client device, such as a client device 420 of a user 422. At block 1020, a self-driving system may be caused to navigate an autonomous vehicle, such as vehicle 100, to the pickup location. At block 1030, a prompt, such as prompt 704, may be sent to the client device to collect semantic information related to the pickup location. At block 1040, a specified location may be determined based on the semantic information received in response to the prompt. At block 1050, one or more semantic markers may be identified for the specified location from the semantic information. At block 1060, a message, such as message 902, may be sent to the client device identifying the specified location using the one or more semantic markers.

Figure 11:
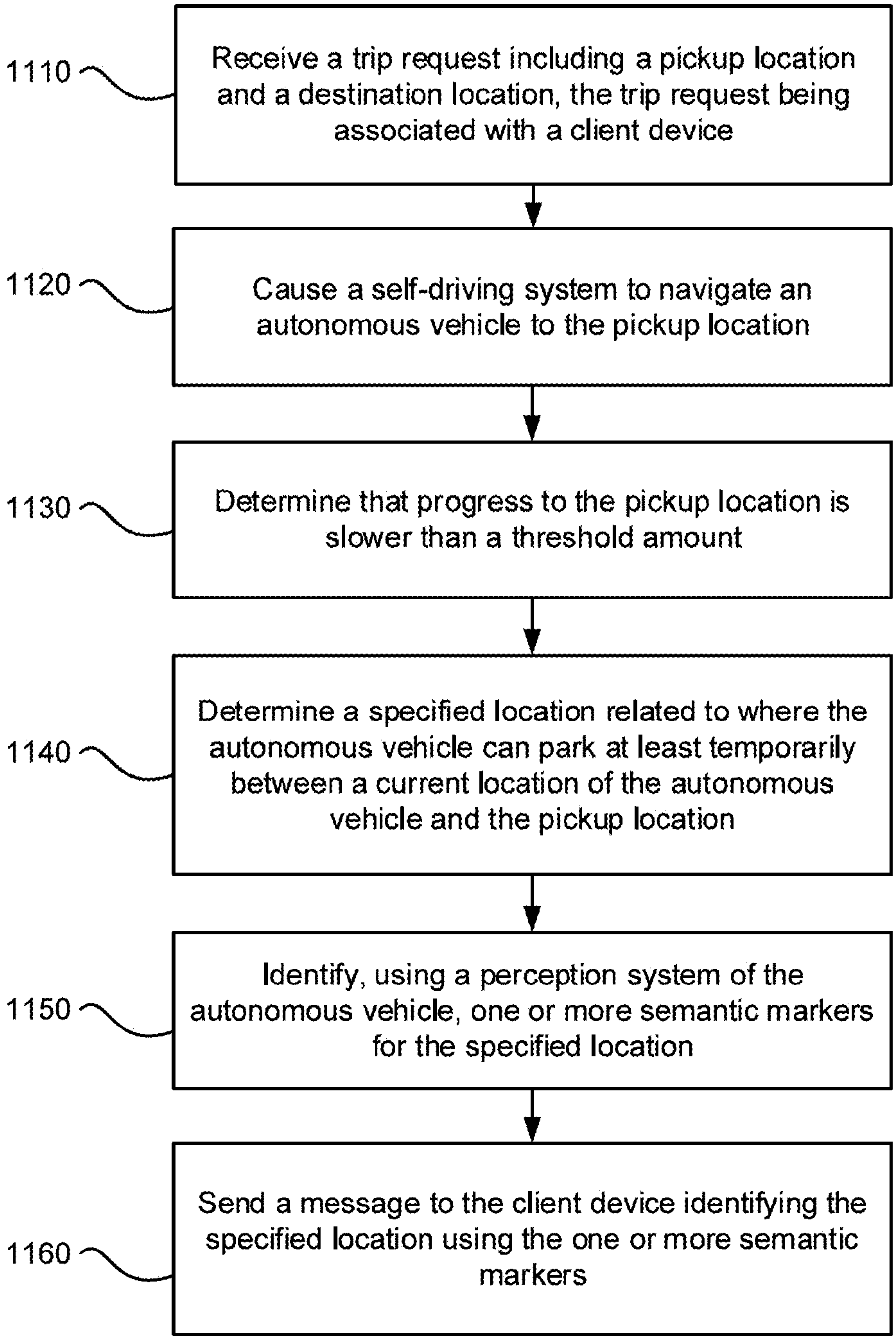
FIG. 11 is another example flow diagram in accordance with aspects of the disclosure.

FIG. 11 shows an example flow diagram 1100 in accordance with aspects of the disclosure. More specifically, FIG. 11 shows a flow of an example method for identifying pickup locations performed by the vehicle's computing devices 110. Alternatively, one or more of the steps in the example method may be performed by one or more computing devices remote from the vehicle 100, such as server computing devices 410.

At block 1110, a trip request, such as trip request 702, may be received that includes a pickup location and a destination location. The trip request is associated with a client device, such as a client device 420 of a user 422. At block 1120, a self-driving system may be caused to navigate an autonomous vehicle, such as vehicle 100, to the pickup location. At block 1130, it may be determined that progress of the autonomous vehicle to the pickup location is slower than a threshold amount. At block 1140, a specified location may be determined related to where the autonomous vehicle can park at least temporarily between a current location of the autonomous vehicle and the pickup location. At block 1150, using a perception system of the autonomous vehicle, one or more semantic markers may be identified for the specified location from the semantic information. At block 1160, a message, such as message 902, may be sent to the client device identifying the specified location using the one or more semantic markers.

The technology herein may allow for an autonomous vehicle and a user to meet at a more precise location by defining the location using semantic information. For example, a distance between the autonomous vehicle and the user at pickup may be smaller. In addition, a user may be more easily identified by the autonomous vehicle, and the autonomous vehicle may be more easily identified by the user. The technology may result in a more natural or smooth experience for the user. For instance, the experience may be more similar to hailing a car driven by a human driver.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:

receiving, by one or more computing devices of an autonomous vehicle, a trip request including a pickup location for picking up a passenger, each of the one or more computing devices having one or more processors;

in response to receiving the trip request controlling, by the one or more computing devices, the autonomous vehicle in an autonomous driving mode to the pickup location;

after receiving the trip request, receiving, by the one or more computing devices, a semantic information related to the pickup location collected by a client device associated with a passenger;

while controlling the autonomous vehicle to the pickup location, identifying, by the one or more computing devices, a plurality of candidate locations based on the received semantic information, wherein each of the plurality of candidate locations satisfies at least one of a plurality of conditions related to picking up the passenger;

determining, by the one or more computing devices, a specified location by selecting one of the plurality of candidate locations that best satisfies a highest number of the plurality of conditions related to picking up the passenger;

sending, by the one or more computing devices, a notification to the client device identifying the specified location using one or more semantic markers related to the specified location; and controlling, by the one or more processors, the autonomous vehicle to the specified location in the autonomous driving mode.

2. The method of claim 1, further comprising:

processing, by the one or more computing devices, the received semantic information in order to identify the one or more semantic markers at or near the pickup location; and wherein the plurality of candidate locations are identified based on the plurality of candidate locations being in a vicinity of the one of the one or more semantic markers.

3. The method of claim 1, wherein the plurality of conditions related to picking up the passenger includes accessibility to the passenger and accessibility to the autonomous vehicle.

4. The method of claim 1, wherein the received semantic information includes text input.

5. The method of claim 1, wherein the received semantic information is received when the autonomous vehicle is within a threshold distance from the pickup location.

6. The method of claim 1, further comprising sending, by the one or more computing devices, as the autonomous vehicle approaches the specified location to pick up the passenger semantic information about the autonomous vehicle to the client device to aid the passenger in recognizing the autonomous vehicle.

7. The method of claim 1, wherein the plurality of candidate locations is identified further based on sensor data stored at the autonomous vehicle.

8. The method of claim 7, wherein the plurality of candidate locations is identified further based on a comparison of the semantic information to the sensor data stored at the autonomous vehicle.

9. The method of claim 1, wherein determining the specified location includes identifying a location where the autonomous vehicle can park temporarily within a perception range of the autonomous vehicle.

10. The method of claim 1, wherein determining the specified location includes determining whether the autonomous vehicle would arrive at the pickup location later than originally predicted by at least a threshold amount.

11. The method of claim 1, further comprising identifying the one or more semantic markers related to the specified location based on a perspective of the passenger according to a location of the client device.

12. A system including an autonomous vehicle comprising:

one or more computing devices having one or more processors configured to:

receive a trip request including a pickup location for picking up a passenger;

in response to receiving the trip request, controlling an autonomous vehicle in an autonomous driving mode to navigate to the pickup location;

after receiving the trip request, receiving semantic information related to the pickup location collected by a client device associate with a passenger;

identify a plurality of candidate locations based on the received semantic information, wherein each of the plurality of candidate locations satisfies at least one of a plurality of conditions related to picking up the passenger;

determine a specified location by selecting one of the plurality of candidate locations that best satisfies a highest number of the plurality of conditions related to picking up the passenger;

send a notification to the client device identifying the specified location using one or more semantic markers related to the specified location; and control the autonomous vehicle to the specified location in the autonomous driving mode.

13. The system of claim 12, wherein the one or more computing devices are further configured to:

process the received semantic information in order to identify the one or more semantic marker at or near the pickup location; and identify the plurality of candidate locations, wherein each of the candidate locations are in a vicinity of the pickup location in the trip request or in a vicinity of one of the one or more semantic markers.

14. The system of claim 12, wherein the plurality of conditions related to picking up the passenger includes accessibility to the passenger and accessibility to the autonomous vehicle.

15. The system of claim 12, wherein the received semantic information includes text input.

16. The system of claim 12, wherein the one or more computing devices are configured to receive the semantic information when the autonomous vehicle is within a threshold distance from the pickup location.

17. The system of claim 12, wherein the one or more computing devices are further configured to send, as the autonomous vehicle approaches the specified location to pick up the passenger, semantic information about the autonomous vehicle to the client device to aid a passenger in recognizing the autonomous vehicle.

18. A non-transitory, computer-readable medium configured to store instructions executable by one or more processors of an autonomous vehicle, the instructions, when executed, cause the one or more processors to perform a method, the method comprising:

receiving a trip request including a pickup location for picking up a passenger;

in response to receiving the trip request, controlling the autonomous vehicle in an autonomous driving mode to the pickup location;

after receiving the trip request, receiving semantic information related to the pickup location collected by a client device associated with the passenger;

identifying a plurality of candidate locations based on the received semantic information, wherein each of the plurality of candidate locations satisfies at least one of a plurality of conditions related to picking up the passenger;

determining a specified location by selecting one of the plurality of candidate locations that best satisfies a highest number of the plurality of conditions related to picking up the passenger;

sending a notification to the client device identifying the specified location using one or more semantic markers related to the specified location; and controlling the autonomous vehicle to the specified location in the autonomous driving mode.

19. The medium of claim 18, wherein the one or more processors are further configured to:

process the received semantic information in order to identify the one or more semantic markers at or near the pickup location; and wherein each of the candidate locations are identified based on the plurality of candidate locations being in a vicinity of the one of the one or more semantic markers.

20. The medium of claim 18, wherein the plurality of conditions related to picking up the passenger includes accessibility to the passenger and accessibility to the autonomous vehicle.

* * * * *